No. 829,496. PATENTED AUG. 28, 1906.
R. WALLWORK.
PROTECTING COVER FOR VEHICLE TIRES.
APPLICATION FILED DEC. 12, 1905.
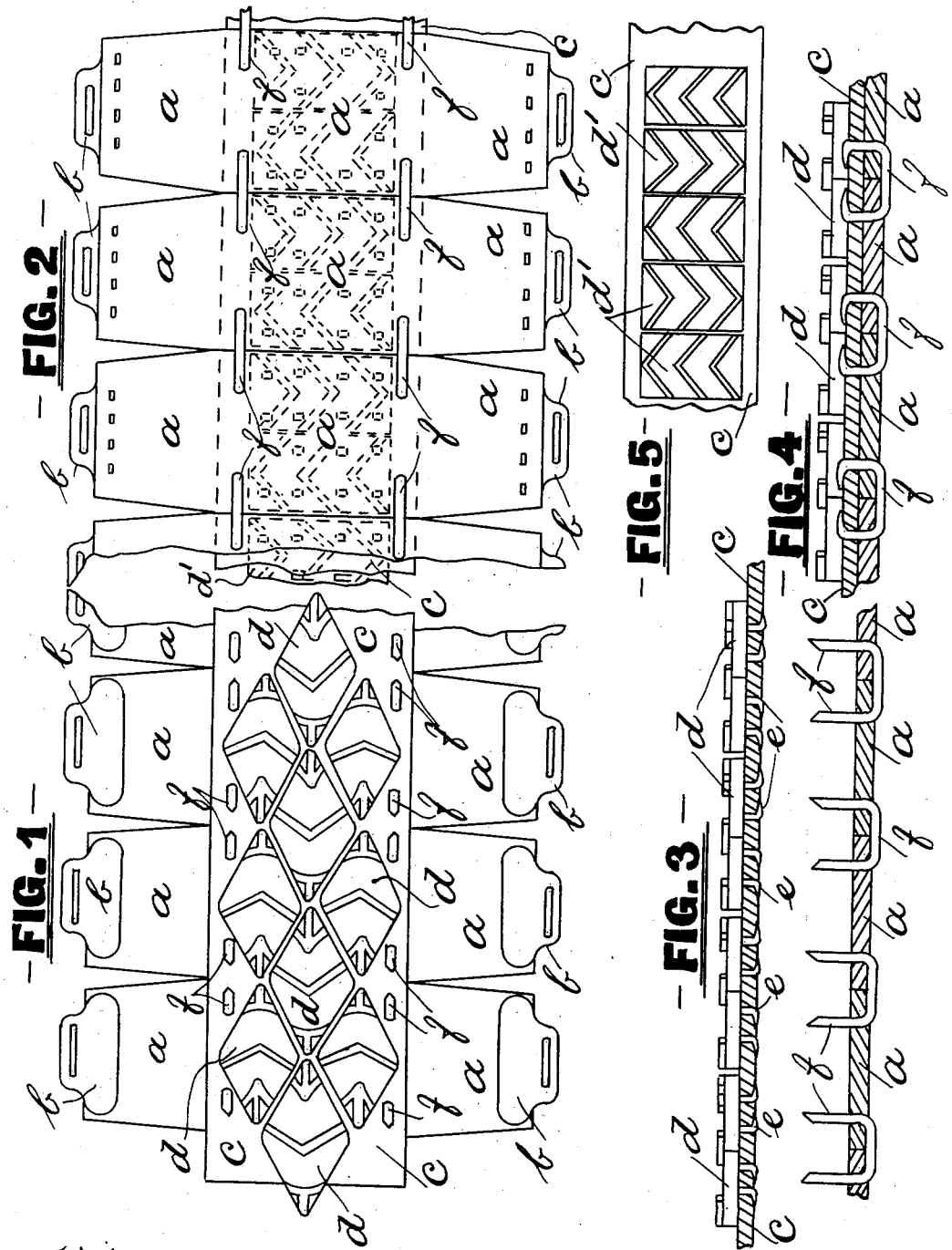

UNITED STATES PATENT OFFICE.

ROUGHSEDGE WALLWORK, OF MANCHESTER, ENGLAND.

PROTECTING-COVER FOR VEHICLE-TIRES.

No. 829,496.　　　　Specification of Letters Patent.　　Patented Aug. 28, 1906.

Application filed December 12, 1905. Serial No. 291,411.

*To all whom it may concern:*

Be it known that I, ROUGHSEDGE WALLWORK, a subject of the King of Great Britain, residing at Union Bridge Ironworks, Roger street, Manchester, in the county of Lancaster, England, have invented a new and useful Improvement in Covers for Protecting the Tires of Vehicles, (for which I have made application for Patent in Great Britain with provisional specification No. 20,642, bearing date October 12, 1905,) of which the following is a specification.

The invention relates to covers for protecting the tires of vehicles, more particularly pneumatic tires, and for preventing side slip or skidding. The object of the invention is to provide a cover of the character indicated with a wearing-surface, as herein described, which is capable of being readily renewed when required, which cover so provided forms an improvement upon the invention for which I have already obtained a patent in the United States, No. 776,570, issued December 6, 1904.

In carrying out my improvements I prefer to utilize small pieces, strips, or sections of material to form the main body of the tire-cover, similarly as described in the specification of the patent above referred to, but instead of attaching the wearing-plates therein named directly to the strips or sections I first attach the plates to a band or bands of leather or other suitable material and capable of passing circumferentially round the tire outside the strips or sections aforesaid.

The wearing-plates may be formed or provided with spikes, prongs, or projections which may be passed through the band or bands and clenched on the far side thereof. Such band or bands having the said wearing-plates attached thereto to form the tread of the tire may be connected to the sections or strips by any suitable means—for example, by staples—so that when it is desired to renew the wearing-surface of the tire-cover the connections between the band or bands and the sections forming the cover only require to be cut or broken, when the whole of the wearing-plates will come away, along with the band or bands so removed.

The means for attaching the strips or sections forming the main body of the cover to the wheel-rim may be as described in the specification of my former patent cited above and such means are not herein claimed as new. The band or bands may be formed otherwise than in one continuous length for each cover without departing from the peculiar character of the invention.

In order that the improvement may be better understood, I will proceed to describe the same with the aid of the accompanying drawings, wherein—

Figure 1 is a plan view, and Fig. 2 a reverse plan, of part of a tire-cover provided in accordance with my invention. Fig. 3 is a sectional view of the same cover, the improved band carrying the wearing-plates being shown in a position prior to connection with the sections forming the base of the cover. Fig. 4 shows the two parts of Fig. 3 connected together by means of staples and so forming the completed cover. Fig. 5 shows part of a band carrying wearing-plates of different form to those shown in Fig. 1.

The same letters indicate corresponding parts wherever they occur.

*a* represents the strips or sections forming the main body of the cover and as described in my former patent aforesaid, while *b* represents the attachments on such sections which engage with a device for securing the cover to the rim of the wheel.

*c* is the special band extending round the cover in one or more lengths and having attached to its surface wearing-plates *d* or *d'*. The band *c* is shown connected to the sections *a* by means of staples *f*, passed through the two thicknesses of material and clenched on the outer surface of the band *c*.

The plates *d* are shown in Fig. 3 attached to the band *c* by means of prongs *e* on such plates which are clenched over on the far side of such band.

Referring to Fig. 1, it will readily be seen that when the plates *d* become worn in use the band *c*, to which they are attached, may be disconnected from the sections *a*, the whole of the plates upon such band being by this means removed simultaneously. A new band carrying a new set of plates may then take the place of the old one, and the cover is again ready for use.

Having now particularly described and ascertained the nature of my said invention and in what manner the same is to be performed, I declare that what I claim is—

In tire-covers, cover-sections, connected together by staples and having attachments for connection to the wheel, a periphery-band on said sections, externally-clenched staples, solely attaching said band to said sections, metal wearing-plates, attached to said band independently of the cover, projections on said plates, clenched on under side of said band, substantially as set forth.

ROUGHSEDGE WALLWORK.

Witnesses:
   GEORGE FREDERICK GADD,
   ARTHUR GADD.